US006346828B1

United States Patent
Rosen et al.

(10) Patent No.: US 6,346,828 B1
(45) Date of Patent: Feb. 12, 2002

(54) METHOD AND APPARATUS FOR PULSED CLOCK TRI-STATE CONTROL

(75) Inventors: Eitan Rosen, Aloha; Thomas D. Fletcher, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/607,291

(22) Filed: Jun. 30, 2000

(51) Int. Cl.[7] .................... H03K 19/00; H03K 19/02
(52) U.S. Cl. .................... 326/56; 326/57; 326/58; 326/86; 327/112
(58) Field of Search .................... 326/56, 57, 58, 326/86, 113; 327/112

(56) References Cited

U.S. PATENT DOCUMENTS

| 4,257,095 A | 3/1981 | Nadir .................... 364/200 |
| 4,761,647 A | 8/1988 | Hallenbeck et al. ... 340/825.22 |
| 5,021,684 A | 6/1991 | Ahuja et al. .................... 307/443 |
| 5,216,289 A | 6/1993 | Hahn et al. .................... 307/270 |
| 5,381,059 A | 1/1995 | Douglas .................... 326/58 |
| 5,398,000 A | 3/1995 | Wu .................... 326/9 |
| 5,453,708 A | 9/1995 | Gupta et al. .................... 326/98 |
| 5,455,957 A | 10/1995 | Pawlowski et al. .................... 395/800 |
| 5,497,114 A * | 3/1996 | Shimozono et al. .................... 327/202 |
| 5,500,817 A * | 3/1996 | McLaury .................... 365/189.05 |
| 5,537,640 A | 7/1996 | Pawlowski et al. .................... 395/473 |
| 5,557,225 A | 9/1996 | Denham et al. .................... 327/199 |
| 5,617,362 A * | 4/1997 | Mori et al. .................... 365/189.05 |
| 5,701,447 A | 12/1997 | Hahn .................... 395/559 |
| 5,721,875 A | 2/1998 | Fletcher et al. .................... 395/500 |
| 5,757,217 A | 5/1998 | Thompson .................... 327/170 |
| 5,793,672 A * | 8/1998 | Wong et al. .................... 365/154 |
| 5,799,161 A | 8/1998 | Merrick .................... 395/309 |
| 5,845,107 A | 12/1998 | Fisch et al. .................... 395/500 |
| 5,900,744 A | 5/1999 | Bisen et al. .................... 326/58 |
| 5,986,473 A | 11/1999 | Krishnamurthy et al. ..... 326/83 |
| 6,028,448 A * | 2/2000 | Landry .................... 326/58 |
| 6,078,980 A | 6/2000 | Holland et al. .................... 710/129 |
| 6,111,898 A | 8/2000 | Banik et al. .................... 370/537 |
| 6,175,253 B1 * | 1/2001 | Maiyuran et al. .................... 326/86 |

FOREIGN PATENT DOCUMENTS

| JP | 362090020 A * | 4/1987 | .................... 326/57 |

OTHER PUBLICATIONS

Hayes, Computer Architecture and Organization, 1978, pp. 103–104 & 401–418, McGraw–Hill Book Company.

Millman, MicroElectronics—Digital and Analog Circuits and Systems, 1979, pp. 151–152 & 632–635, McGraw–Hill Book Company.

Mano, Digital Logic and Computer Design, 1979, pp. 576–578, Prentice–Hall, Englewood Cliffs, NJ.

* cited by examiner

*Primary Examiner*—Michael Tokar
*Assistant Examiner*—Steven S. Paik
(74) *Attorney, Agent, or Firm*—Blakely, Sokoloff, Taylor & Zafman LLP

(57) ABSTRACT

A pulsed clock tri-state controller uses pulsed clock logic to control a tri-state bus driver. A clock shaper generates a pulsed clock bar signal. The pulsed clock tri-state controller utilizes the pulsed clock bar signal to sample a data input signal and an enable input signal into latches to generate a data signal and an enable signal for a tri-state bus driver. Receivers on the tri-state bus, such as latches or registers, are clocked using a locally generated pulsed clock bar signal from a local clock shaper. The pulsed clock tri-state controller, tri-state bus drivers, and the pulsed receivers provide an efficient method for transferring data over a tri-state bus.

34 Claims, 6 Drawing Sheets

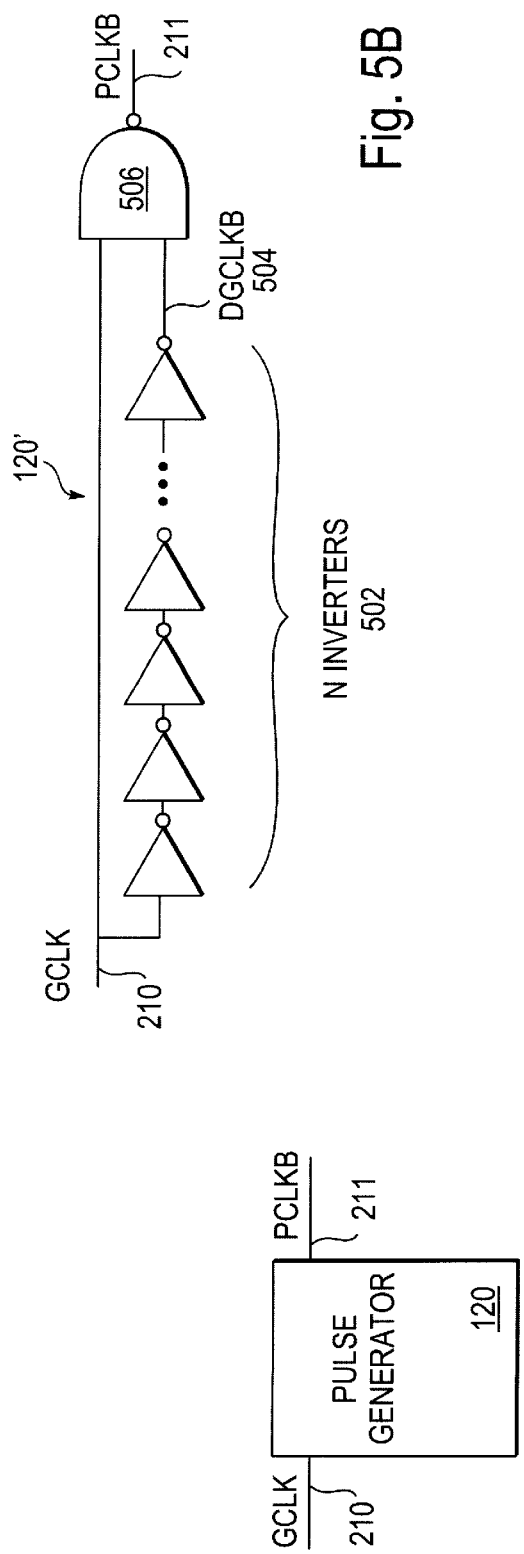
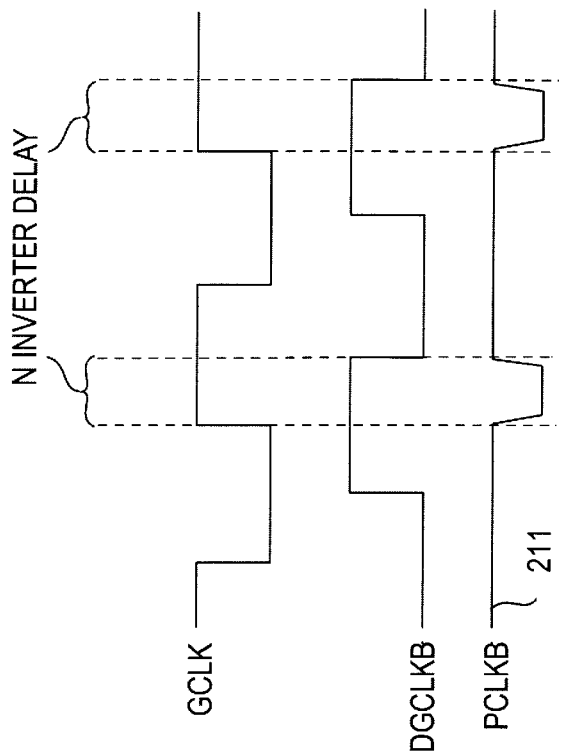
Fig. 5A
Fig. 5B
Fig. 5C

METHOD AND APPARATUS FOR PULSED CLOCK TRI-STATE CONTROL

FIELD OF THE INVENTION

The present invention relates generally to tri-state bus arbitration, and specifically to the control of tri-state bus drivers and receivers.

BACKGROUND OF THE INVENTION

A bus is a set of wires or metal traces designed to transfer all bits of a data word, address or control signal from a specified source to a destination. A bus may be unidirectional (i.e. one way communication) or bi-directional (i.e. two way communication). Additionally, a bus may be dedicated or shared. A dedicated bus is a bus with a unique source and destination. A shared bus is a bus which connects one of several sources with one of several destinations. A disadvantage to dedicated busses is that multiple dedicated buses may be necessary for coupling multiple sources and destinations together. As the bus widths increase to handle greater amounts of data in parallel, the number of wires or metal traces increase which can use significant area within an integrated circuit or printed circuit board.

One type of bi-directional shared bus is a tri-state bus. A tri-state bus is a localized network bus and is used to efficiently route data, address and or control signals over a single set of bus wires. Multiple tri-state bus drivers and receivers (such as latches or registers) are coupled to the tri-state bus in order to share it to route signals from one of a plurality of sources to one or more of a plurality of destinations. As a result of the multiple tri-state drivers and receivers sharing a single bus, bus arbitration is important. Bus arbitration of a tri-state bus includes the enable timing of tri-state drivers driving the tri-state bus and the clocking of receivers coupled to the tri-state bus. While multiple receivers may be listening to receive information off a tri-state bus at the same time, only one driver should be driving the tri-state bus at a time in order to avoid excessive power consumption, false signals, and possible circuit damage. Therefore, the tri-state bus is time shared by the tri-state drivers (i.e. sources) and the receivers (i.e. destinations) in order to avoid bus contention or collisions. The communication between tri-state drivers and receivers can be asynchronous or synchronous. In a synchronous system the drivers and receivers communicate between each other at known periods of time and are usually synchronized together by using the same clock source. Asynchronous systems have communication at any time and usually include a control signal, a flag or a destination address with the information being transferred so that the destination can determine that it needs to receive the information being transferred. Asynchronous systems are often employed where the data transmission time periods are different from sources to destinations over the bus. Synchronous system are often employed where the data transmission time period is to be substantially the same between sources and destinations.

Tri-state drivers, also refereed to as three state buffers, are well known. Tri-state inverters or three state inverters are similar to tri-state drivers but have a logical inversion from input to output. Tri-state drivers and inverters typically have three output states, a high level (logical one), a low level (logical zero) and a high impedance state (logically referred to as a Z or unknown state). The output of tri-state drivers and inverters when enabled actively drive a tri-state bus to a high level or a low level. When disabled, the output of tri-state drivers and inverters are not actively driving the tri-state bus and are in a high impedance state. In the high impedance state the output resistance of the tri-state buffer and inverter when looking into the output is ideally infinite. In reality there is typically some leakage current associated with the output stage of the tri-state buffer or inverter such that they have a relatively high finite amount of impedance.

With the increase in system clock frequencies to improve system performance, bus arbitration timing has become more important in order to accommodate increasing clock frequencies. It is desirable to provide an improved tri-state control method and apparatus to provide improved bus arbitration timing for increased system performance.

BRIEF DESCRIPTION OF THE DRAWINGS

FIG. 5A illustrates a block diagram of a pulse generator for the generation of the pulse clock bar signal (PCLKB).

FIG. 5B illustrates a schematic diagram of an exemplary pulse generator for the generation of PCLKB.

FIG. 5C illustrates a timing diagram of the generation of PCLKB using the rising edge of a global clock signal (GCLK) as a trigger.

DETAILED DESCRIPTION

In the following detailed description of the present invention, numerous specific details are set forth in order to provide a thorough understanding of the present invention. However, it will be obvious to on e skilled in the art that the present invention may be practiced without these specific details. In other instances well known methods, procedures, components, and circuits have not been described in detail so as not to unnecessarily obscure aspects of the present invention.

It is necessary for a tri-state bus system to enable arbitration between multiple tri-state drivers on a single shared net and accommodate multiple receivers. Therefore, the timing requirements for signals of each element (receiver and driver) should be considered. It is desirable to meet the timing requirements for the signals of each element without creating a race condition. To avoid a race condition, it is desirable to make signal timing frequency dependent. If the signal timing is dependent on the frequency of a system clock, then reducing the frequency of the system clock can relax the timing requirements. This is desirable if there is a problem with the signal timing such that a circuit does not function. If this occurs, reducing the system clock relaxes the signal timing such that the circuit may be able to function. However, it is also desirable in some instances to make certain clocking signals independent of the frequency of the system clock.

In a tri state bus system it is desirable to maximize the time for data signal propagation over the tri-state bus. The tri state bus system may actually provide "time borrowing" or "cycle stealing" in order to maximize the time for signal prorogation. "Time borrowing" refers to a combination of circuit elements in a signal path having an overall timing objective where time is borrowed from a system clock cycle in one element in the signal path at the expense of another element in the signal path. A circuit element time borrows if it can use the time of a previous, or next, phase or cycle of a system clock to perform a function. Time borrowing is used by a circuit element in a pipeline that needs an extended time over which to evaluate its final state. The time is usually borrowed from a circuit element that has a short delay over which its final state is evaluated. Time borrowing by a circuit element also reduces the need to allocate timing margin to the evaluation time in a pipeline stage due to clock skew and jitter (CSJ) and enables the averaging of the delay in a signal path across multiple cycles. Finally, the tri-state bus system should be able to be used with existing circuits and logic. The present invention meets these goals.

Figure 1:
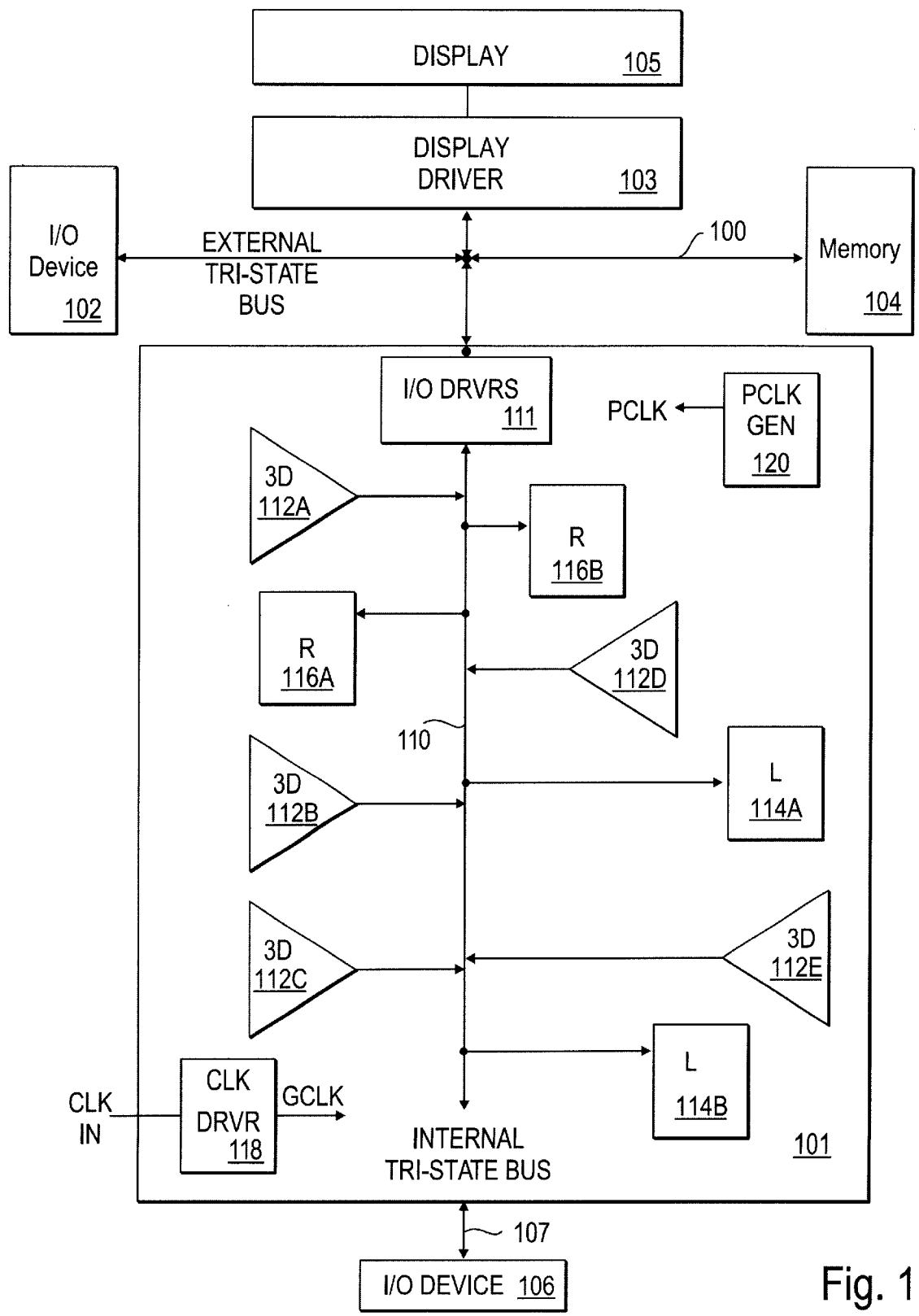
FIG. 1 illustrates a block diagram of a computer system having an external tri-state bus which includes a microprocessor having an internal tri-state bus.

Referring now to FIG. 1, a block diagram of a computer system is illustrated. The computer system of FIG. 1 includes an external tri-state bus 100, which couples microprocessor 101, I/O device 102, display driver 103, and memory 104 together. Display drive 103 is coupled to display 105 in order to communicate information visually to a user. While I/O device 102 is coupled to the external tri-state bus 100 to communicate information to the microprocessor 101, I/O device 106 is otherwise coupled to microprocessor 101 by means of a dedicated bus 107. The external tri-state bus 100 is a shared bi-directional tri-state bus. Microprocessor 101 includes an internal tri-state bus 110. Internal tri-state bus 110 is a shared bi-directional tri-state bus. Microprocessor 101 further includes I/O drivers 111 for communicating information between the internal tri-state bus 110 and the external tri-state bus 100. Microprocessor 101 includes tri-state drivers 112A–112E, latches 114A and 114B, and registers 116A and 116B coupled to the internal tri-state bus 110. The tri-state drives 112A–122E act as sources of information to communicate over the bus 110 while the latches 114A and 114B and the registers 116A and 116B act as destinations for information from the bus 110. For the microprocessor 101 to synchronize communication between the sources and destinations over the internal tri-state bus 110, it includes a clock driver 118 and a pulse clock generator 120. The clock driver 118 receives an external clock source input to generate a global clock GCLK for the system. The global clock GCLK is a system clock. The global clock GCLK ideally has a duty cycle of fifty percent. That is, the low level duration and the high duration of the waveform are equal. In reality due load conditions and circuitry used to generate the clock waveform, the duration of each of the levels is only near fifty percent of the time period for the given frequency. The pulse clock generator receives the global clock signal in order to generate the pulse clock bar signal PCLKB.

The logical state of the microprocessor 101 is maintained by "state elements," such as flip flops, latches and domino cells. These state elements of the microprocessor sometimes communicate with each other over the tri-state bus system. In order to maintain their states efficiently, the state elements of the microprocessor are clocked by a pulsed clock signal which is governed by a global "clock" signal. The global clock signal is generated by a global clock generator and distributed to groupings of localized state elements where it is converted locally by a pulsed clock generator into a pulsed clock signal. The pulsed clock signal is generated so that its rising edge and the falling edge of the pulsed clock signal relate to one of either the global clock rising edge or the global clock falling edge depending upon which edge is desired to be used for generating the pulsed clock signal. The pulse width of the pulsed clock signal is dependent upon a time period delay independent of the frequency of the global clock signal. This means that time period of the pulse width of the pulsed clock signal is frequency independent because it's duration is set by the delay of gates, random logic, or circuitry, such as inverters, within each localized pulse clock generator. The integration of the state elements with the tri state busses of the microprocessor 101 is important to its operation.

Figure 2:
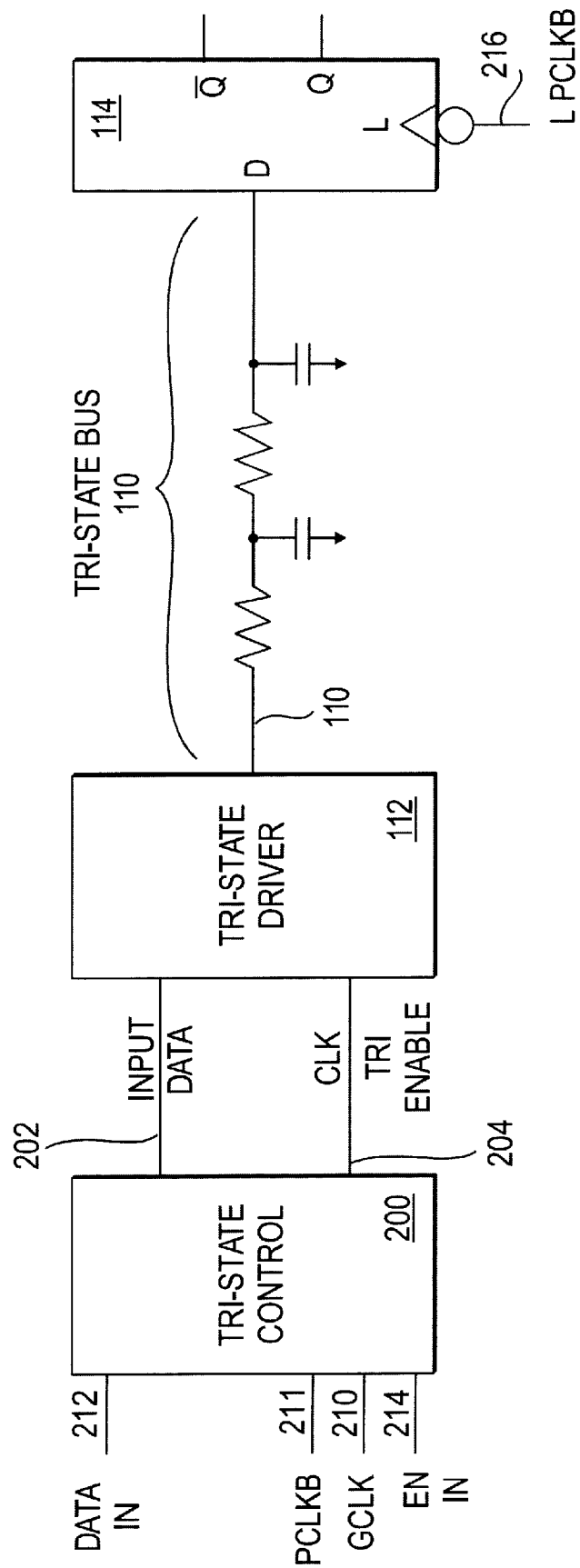
FIG. 2 illustrates a block diagram of the elements to drive a tri-state bus and to receive data therefrom.

Referring now to FIG. 2, a functional block diagram of the elements of the tri-state bus system of the present invention is illustrated. The tri-state bus system provides communication and control information flow between a source and a destination over the tri-state bus. A tri state driver 112 receives data 202 and enable 204 input signals. The output from the tri state buffer 112 is sent to a receiver, such as a cycle receiver latch 114. The tri-state bus 110 inherently includes resistors and capacitors such that output from the tri-state driver 112 will have some propagation delay over the tri-state bus 110 before reaching the latch 114. It is desirable in the tri-state control of the tri-state driver 112 to consider such inherent delay over the tri-state bus 110 to the latch 114. Tri-state control 200 receives data input DATA IN 212, the pulsed clock bar signal PCLK 211, a global clock GCLK 210 and an enable input signal EN IN 214. A tri-state controller 200 generates an input data signal 202 and a clock tri-state enable signal 204. The input data signal 202 and the clock tri-state enable signal 204 are coupled into the tri-state driver 112. In response to the input data signal 202 and the clocked tri-state enable signal 204, the tri-state driver 112 will either generate a signal on to the tri-state bus 110 or be placed into a tri-state or high impedance state. The latch 114 has a data input coupled to the tri-state bus 110 for receiving data from the tri-state driver 112. The latch 114 receives a latched pulse clock bar signal LPCLKB 216 in order to clock the latch 114 at the appropriate time to receive data from the tri-state bus 110. Latch 114 is transparent during one phase of the LPCLKB signal 216 such that data on the tri-state bus passes to the outputs of the latch 114. Latch 114 may include one or more outputs including Q and negative Q outputs. During another phase of the LPCLKB signal 216, the latch holds a prior data state from the tri-state bus 110 regardless of changes in the tri-state bus 110. The tri-state driver 112 in FIG. 2 represents sources of information to be communicated across the tri-state bus 110. The latch 114 represents tri-state bus receivers or destinations for a source.

Figure 3:
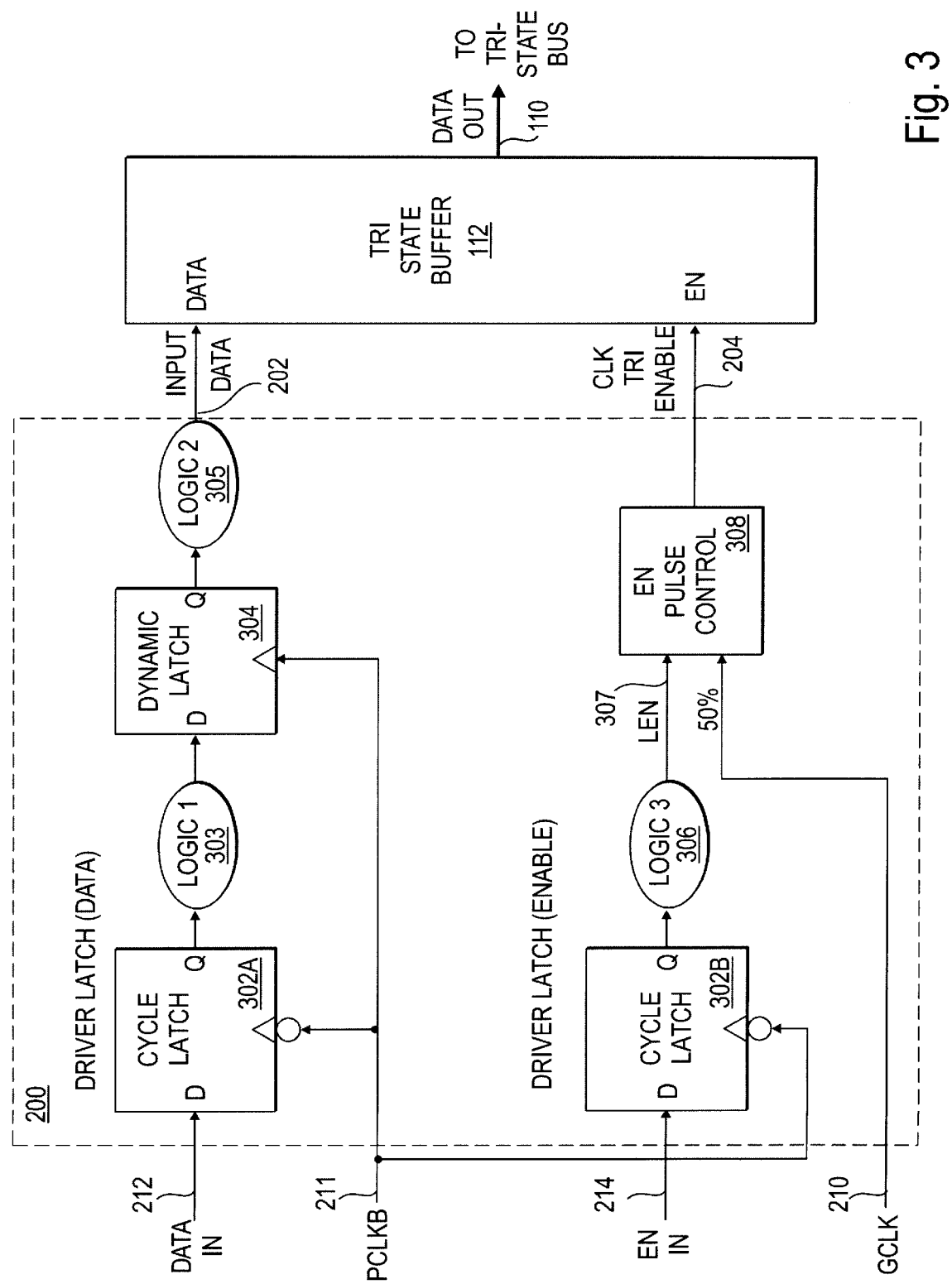
FIG. 3 illustrates a functional block diagram of the tri-state controller coupled to the tri-state buffer of FIG. 2.

Referring now to FIG. 3, a functional block diagram of the tri-state driver control system of the present invention is illustrated. The tri-state driver control system of the present invention utilizes a pulsed tri state bus control methodology. The tri-state driver control system includes the tri-state driver controller 200 coupled to the tri-state buffer 112. The tri-state driver controller 200 includes a cycle latch 302A, a dynamic latch 304, a cycle latch 302B and an enable pulse controller 308. The tri-state driver controller 200 may additionally include a first logic block 303, a second logic block 305 and a third logic block 306. The third logic block 306 may be additional control logic used to condition the enabling of the tri-state buffer 112. The first logic block 303 and the second logic block 305 may be additional random logic to condition the data input signal prior to being driven out by the tri-state buffer 112 onto the tri-state data bus 110.

A pulsed clock signal, the pulse clock bar signal PCLKB 211 is coupled into the inverted clock inputs of the cycle latches 302A and 302B and the dynamic latch 304. The pulse clock bar signal PCLKB 211 is coupled into a clock input of the dynamic latch 304. The global clock GCLK 210 is coupled as an input into the enable pulse controller 308. The data input signal 212 is coupled into the input of the cycle latch 302A. The enable input (EN IN) signal 214 is coupled into the input of the cycle latch 302B. The enable pulse controller 308 receives a latched enable signal (LEN) 307 and the global clock GCLK 210 to generate the clock tri-state enable control signal 204. The output from the dynamic latch 304 may be qualified by the second logic block 305 to form the latched data signal 202. The input data signal 202 is coupled into the data input (DATA) of the tri-state buffer 112. The clocked tri-state enable signal 204 is coupled into the enable input (EN) of the tri-state buffer 112. In response to input data signal 202 and the clocked tri-state enable signal 204, the tri-state buffer 112 drives the data output onto the tri-state bus 110 or not. The tri-state buffer 112 can drive the tri-state bus 110 in an active state to a high (logical one) or a low (logical zero) or it can be inactive and tri-stated to a high impedance state (logical Z or unknown state) so that another tri-state buffer can drive the tri-state bus 110.

The data flow through to the tri-state buffer is as follows. The data input signal 212 passes first through the transparent cycle driver latch 302A. The data signal may then go through the first logic block 303 and into the dynamic latch 304. From the dynamic latch 304, the data signal may go through the second logic block 305 before reaching the tri state buffer 112. The dynamic latch essentially separates the logic delay between the cycle latch 302A and the tri-state buffer 112 into two small separate delay periods within the first logic block 303 and the second logic block 305. The input data signal 202 is not sampled by the tri-state buffer 112. However, the input data signal 202 should be valid prior to three inverter or gate delays after the falling edge of the global clock signal GCLK. The tri-state data bus is not driven until then so there is no need for the input data signal 202 to be valid sooner. However, an input data signal being valid later than that time will have a shorter time period to propagate onto the tri-state bus which may still be a sufficient period of propagation time. Clock skew and jitter margins are not required as a result. The tri-state driver needs to maintain the data on the tri-state data bus until a receiver latch in a receiver that is to receive the data off the tri-state data bus stops sampling or the driver stops driving, whichever occurs sooner.

The enable input signal flow to the tri-state buffer is as follows. The enable input signal 214 passes first through a transparent cycle latch 302B as the latched enable signal LEN 307. The latched enable signal LEN 307 may then go through the third logic block before reaching the enable pulse controller 308. The enable pulse controller receives the global clock signal GCLK and reshapes it before combining it with the latched enable signal. The latched enable signal LEN 307 should be valid one inverter or gate delay after the falling edge of the global clock signal GCLK. Prior to this time, the latched enable signal LEN 307 is masked and does not effectively control the tri state buffer 112. If the latched enable signal 307 is a valid logical one which is later in time (i.e. a late "1"), it will reduce the available propagation time of data over the tri-state bus. If the latched enable signal 307 is a valid logical zero which is later in time (i.e. a late "0"), it is possible that more than a single tri-state buffer 112 could be driving the tri-state bus at a time (per node) and momentary current consumption could result if conflicting logical states are trying to be driven onto the tri-state bus at the same time. Neither of these late circumstances will cause a circuit failure. The latched enable signal LEN 307 should be held valid at the input into the enable pulse controller 308 for at least approximately five inverter or gate delays after the rising edge of the global clock signal GCLK. The five inverter or gate delays can be met using logic in the third logic block 306 in which case the cycle latch 302B may not be needed in this path.

The block diagram of circuit illustrated in FIG. 3 is race free. It will not have a bus contention problem if the timing requirements previously discussed are satisfied. Additionally because the global clock is provided as an input to the circuit, it is frequency dependent. Therefore, if the frequency is reduced the timing requirements become less stringent and will be met at a lower frequency. That is, the separation between the time for new data to be driven onto the data bus and old data to be received from the data bus (being sampled) increases. Both data and clocked tri-state enable are preferably generated during phase one (the low level phase) of the global clock GCLK and are ready to be driven at the beginning of phase two (the high level phase) of the global clock GCLK. Preferably, the clocked tri-state enable signal 204 provided tri-state buffer is asserted three inverter or gate delays after the falling edge of the global clock GCLK. The clocked tri-state enable signal 204 allows the input data signal 202 to be driven out onto the tri-state data bus 110 during the second half of the global clock GCLK. The data on the tri-state data bus is received and sampled by a cycle latch. In order to do so, the clocked tri-state enable signal 204 allows the tri-state driver 112 to keep driving the tri-state bus for seven, eight or more inverter or gate delays into phase one clock in the preferred embodiment. This timing provided by the clocked tri-state enable signal, allows the circuits at the driving end (tri-state driver 112) and/or the receiving end (cycle latch) to time borrow (i.e. cycle steal) to obtain additional evaluation time for logical evaluations or propagation time for signal propagation.

In order to prevent bus contention on the tri state bus 110, the latched enable signal LEN is "ANDed" starting on the rising edge of a global clock bar signal (GCLKB). The global clock bar signal GCLKB is logically an inverted global clock signal GCLK but may additionally have a different clock shape. In order to provide time borrowing (i.e. cycle stealing), the rising edge of the global clock signal GCLK 210 is delayed into a delayed falling edge of the global clock bar signal (GCLKB). The added delay in the falling edge of the global clock bar signal (GCLKB) may be as much as the expected clock skew and jitter of GCLK between sources and receivers if enable timing is critical.

The input data signal 202 should be available before the clocked tri-state enable signal 204 is asserted. Otherwise if data timing is critical and the data setup is not possible to meet, a glitch on the bus may result. If output data timing results from the data timing (as opposed to the enable timing), than the tri state driver is time borrowing and indifferent to the jitter of the falling edge. If data timing is not critical, input data signal 202 should be available as the clocked tri-state enable signal 204 is asserted on its rising edge.

Figure 4:
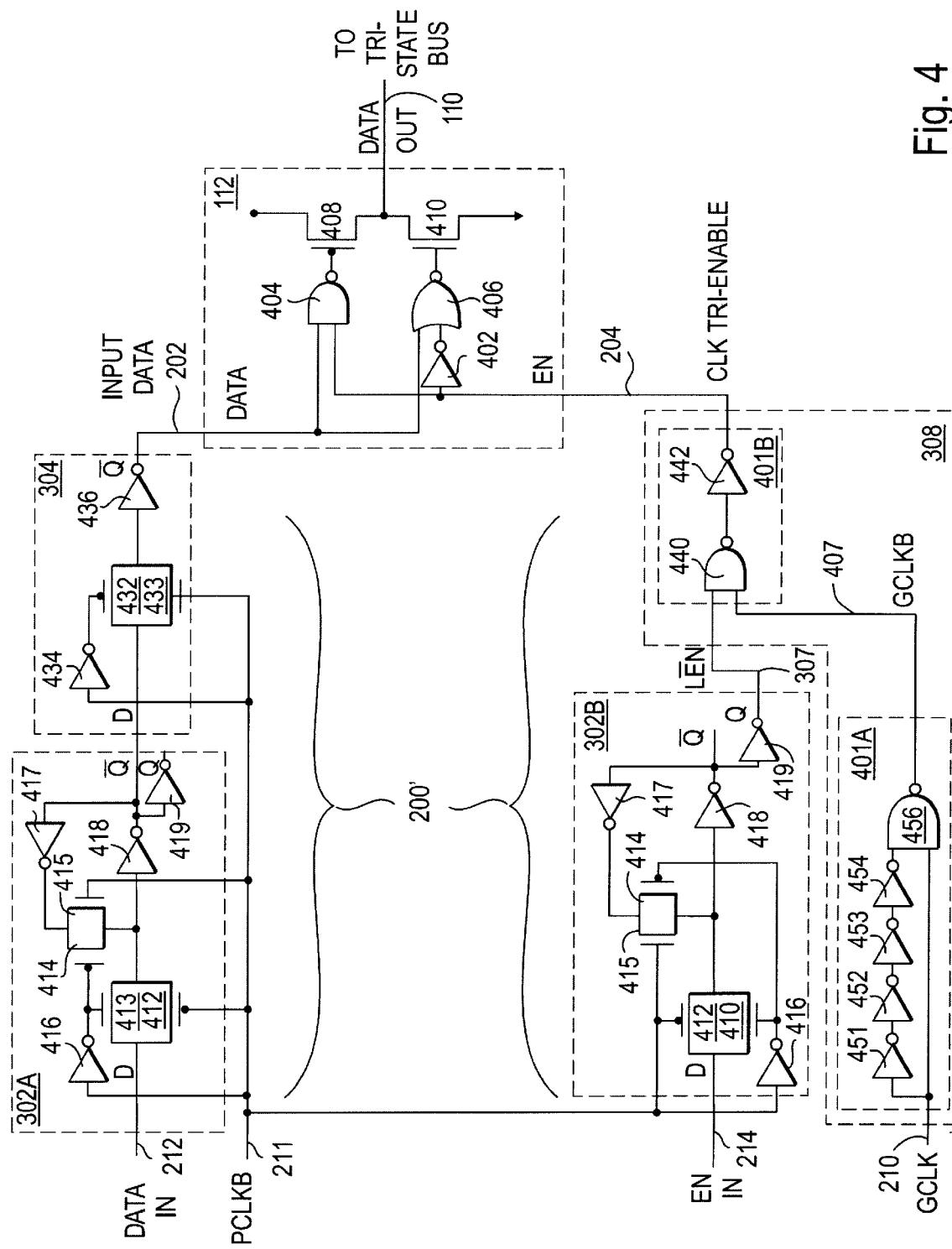
FIG. 4 illustrates a schematic diagram of exemplary circuitry of the tri-state controller and tri-state buffer of FIG. 3.

Referring now to FIG. 4, a schematic diagram of exemplary circuitry of the tri-state controller 200' and the tri-state buffer 112 of FIG. 3 are illustrated. In FIG. 4, the first logic block 303, second logic block 305 and third logic block 306 are not utilized in the tri-state controller 200' as compared with tri-state controller 200 in FIG. 3. The circuitry of FIG. 4 is a phase two static drive tri-state bus driver scheme. That is, the tri-state bus driver 112 statically drives the tri-state bus 110 on phase two of the global clock GCLK.

The exemplary tri-state buffer 112 includes an inverter 402, a NAND gate 404, a NOR gate 406, p-channel field effect transistor (PFET) 408, and an n-channel field effect transistor (NFET) 410. The input data signal 202 is coupled into the NAND gate 404 and the NOR gate 406. The clocked tri-state enable signal 204 is coupled into the inverter 402 and the NAND gate 404. The output from the inverter 402 is coupled into the NOR gate 406. The output of NAND gate 404 is coupled into the gate of the PFET 408. The output of the NOR gate 406 is coupled into the gate of the NFET 410.

When the clocked tri-state enable signal 204 is a low level, the tri-state buffer 112 is disabled generating a high impedance output. In this case, the output from NOR gate 406 is a low level and the output from NAND gate 404 is a high level such that PFET 408 and NFET 410 are both turned off. When the clocked tri-state enable signal 204 is a high level, the tri-state buffer 112 is enabled. In this case, the NAND gate 404 and the NOR gate 406 act like inverters inverting the input data signal 202 and applying this logic level to the gates of the PFET 408 and the NFET 410. In this case the latch data 202 is inverted by NOR gate 406 and coupled into the gate of the NFET 410. The input data signal 202 is inverted by the NAND gate 404 and coupled into the gate of the PFET 408. The PFET 408 and NFET 410 provide an additional inversion such that the logical state of the input data signal 202 is driven out onto the tri-state bus 110.

The tri-state controller 200' includes the cycle latch 302A, the dynamic latch 304, the cycle latch 302B, and the enable pulse controller 308. Each of the cycle latches 302A and 302B includes a pair of transfer gates each consisting of a PFET 412, an NFET 413, a PFET 414 and an NFET 415. Each of the cycle latches 302A and 302B further include inverters 416, 417, 418, and 419. The Q output of the cycle latch 302B from inverter 419 is selected to be coupled into the enable pulse controller 308. The negative Q output of the cycle latch 302A from inverter 418 is selected to be input into the dynamic latch 304. The dynamic latch 304 includes a transfer gate consisting of PFET 432 and NFET 433 to receive the D input. Dynamic latch 304 further includes inverter 434 to invert the clock input signal for the gate of PFET 432 and inverter 436 to generate the negative Q output. The output of inverter 436 generates the input data signal 202.

The enable pulse controller 308 includes a clock shaper 401A and an AND gate 401B. The AND gate 401B consists of a NAND gate 440 with an output coupled into an inverter 442. The output of the AND gate 401B from inverter 442 is the clocked tri-state enable signal 204. The clock shaper 401A includes an even numbered series of inverters 451, 452, 453, and 454 to generate a delayed global clock signal which is coupled into one of the inputs of a NAND gate 456. The other input into the NAND gate 456 is the global clock signal GCLK 210. The output from NAND gate 456, the global clock bar signal GCLKB 407, is coupled into the NAND gate 440 as its second input.

The clock shaper 401A generates the global clock bar signal (GCLKB) 407 for the enable pulse controller 308. The rising edge of the global clock signal GCLK 210 is delayed into a delayed falling edge of the global clock bar signal (GCLKB) 407 by the even numbered series of inverters 451, 452, 453, and 454. The delay DF of the delayed falling edge of the global clock bar signal (GCLKB) 407 can be further increased by increasing the even number of inverters in series before NAND gate 456. However, the pulse width PW of the pulsed clock bar signal PCLKB 211 needs to be a larger time period than that of the delay difference DF between the delayed falling edge of the global clock bar signal (GCLKB) 407 and the rising edge of the global clock signal GCLK 210. In FIG. 4 on the rising edge of the global clock signal GCLK, there are seven gate delays from inverter 451 to the generation of the clocked tri-state enable signal 204. The falling edge of the global clock signal GCLK 210 generates the rising edge of the global clock bar signal (GCLKB) 407 more quickly because of the absence of inverters 451–454 in the signal path to NAND gate 456. In FIG. 4 on the falling edge of GCLK, there are three gate delays from the input of GCLK signal 210 to the generation of the clocked tri-state enable signal 204.

The AND gate 401B in essence performs the gating of the latched enable signal LEN with the global clock signal GCLK. The delay of GCLKB 407 from GCLK 210 provides selective shaping of the timing of the clocked tri-state enable signal 204. The delay differences in the falling edge of the global clock bar signal (GCLKB) and rising edge of the global clock bar signal (GCLKB) in comparison with the respective edges of the global clock signal (GCLK), provides for time borrowing (i.e. cycle stealing) between sources and receivers on the tri-state data bus 10.

Referring now to FIG. 5A, a block diagram of a pulse generator 120 is illustrated. The pulse generator 120 is locally used near the circuitry that requires the pulsed clock bar signal PCLKB 211. Pulse generator 120 receives the global clock signal 210 as an input in order to generate the pulsed clock bar signal PCLKB 211. Referring now to FIG. 5B, a schematic diagram of an exemplary pulse generator 120' for the generation of the pulsed clock bar signal PCLKB 211 is illustrated. The exemplary pulse generator 120' includes an odd numbered series of N inverters 502 (where N is an odd number) and a NAND gate 506. The first inverter of the odd numbered series of N inverters 502 receives the global clock signal 210 as an input to generate a delayed global clock bar 540 at the output of the last inverter in the series. The global clocks signal 210 and delayed global bar signal 540 are both input into the NAND gate 506. NAND gate 506 generates the pulsed clock bar signal PCLKB 211 at its output. Referring now to FIG. 5C, a timing diagram for the generation of the pulsed clock bar signal PCLKB 211 is illustrated. As can be seen from the waveforms 211 and 210, the pulsed clock bar signal PCLKB 211 is generated on each rising edge of the global clock signal GLCK 210. The pulse width of the pulsed clock bar signal PCLKB 211 is a function of the number of odd numbered series of N inverters 502 that are used.

Figure 6:
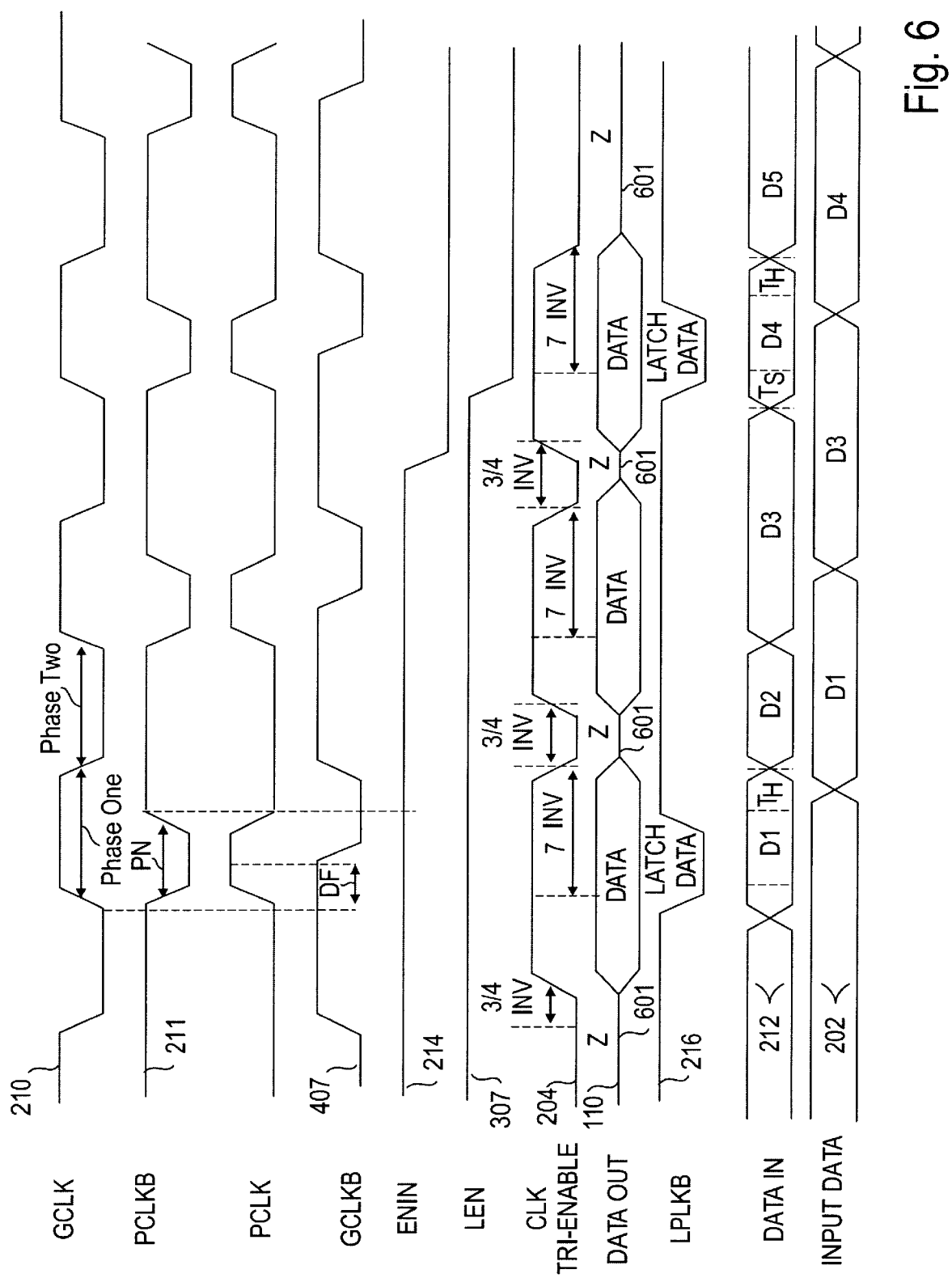
FIG. 6 illustrates a timing diagram of signals surrounding the elements of the tri-state bus of FIG. 2.

Referring now to FIG. 6, exemplary signal timing diagrams for signals of the tri-state control system are illustrated. Global clock signal GCLK 210 is illustrated having a fifty percent duty cycle with a nominal rise and fall time on its rising and falling edges respectively. The pulsed clock bar signal PCLKB 211 is illustrated as being generated on the rising edge of GCLK similar to that of FIG. 5C. A pulsed clock signal PCLK is the inverted or negative of the pulsed clock bar signal PCLKB 211. PCLK is internally generated by inverters 416 and 434 in the latches illustrated in FIG. 4. The global clock bar signal GCLKB is illustrated having its delayed falling edge from the rising edge of the global clock GCLK. The pulse width PW of the pulsed clock bar signal PCLKB 211 is a larger time period than that of the delay difference DF between the delayed falling edge of the global clock bar signal (GCLKB) 407 and the rising edge of the global clock signal GCLK 210. When the enable input EN IN 214 is high on a given cycle, the tri-state driver can be enabled on the next cycle. The active edges of the clocked tri-state enable signal 204 is shown having three or four inverter or gate delays from the falling edge of the global clock GCLK and seven inverter or gate delays from the rising edge of the global clock GCLK. After the tri-state driver 112 is enabled by the clocked tri-state enable signal 204, data can be driven onto the tri-state bus 110. During the periods where the tri-state driver 112 is disabled (i.e. tri-stated such as during periods 601), the tri-state driver is in a high impedance state and does not influence the tri-state bus 110.

When the data is driven onto the tri-state bus 110 by the tri-state driver 112, a latch pulsed clock bar signal (LPCLKB) is generated locally at the receiver to latch the data on the tri-state bus 110. The latch pulsed clock bar signal LPCLKB is generated similar to PCLKB but is gated by a selection signal so that the proper receiver receives the data. Thus, LPCLKB has similar timing to PCLKB but may not occur every cycle of the global clock GCLK. During the low level pulses of the LPCLKB, data is latched into a latch or register of a receiver.

The data timing for the DATA IN signal 212 to generate the input data signal 202 is illustrated in the lower two waveforms. The DATA IN signal 212 is sampled by the cycle latch 302A during the low pulses of the pulsed clock bar signal PCLKB 211 and sampled during the high pulses of the pulsed clock bar signal PCLKB 211 by the dynamic latch 304. The combination of the cycle latch 302A and the dynamic latch 304 operate similar to a register such that the input data signal 202 is available on the rising edge of the pulsed clock bar signal PCLKB 211. Data D2 of the DATA IN signal 212 was not stable for a long enough period of time, such as during logic evaluation, for it to be sampled. Data D3 of the DATA IN signal was sampled instead to generate the input data signal 202.

The present invention has many advantages over the prior art. One advantage of the present invention is that it is dependent on the clock frequency so that reductions in frequency can improve timing to ease troubleshooting. Another advantage of the present invention is that it can borrow time from another cycle and expand the signal propagation time in order to complete the data transfer over the tri-state bus between a driver and latch. Still another advantage of the present invention is that it is free of race conditions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the present invention has been described herein with reference to phase two of a clock signal and can be readily adapted for phase one of the clock. Furthermore, the latch elements have been described as being clocked using a pulse clock bar signal having low level pulses but can easily be modified to be clocked using a pulsed clock signal have high level pulses and visa versa, Additionally, the present invention has been described as triggering on the positive edge of a clock waveform and can be readily adapted to triggering on the negative edge of the clock waveform. Furthermore, the present invention has been described as using inverters to generate a time delay period independent from the clock frequency. However other gates, logic elements or circuitry, including one or more resistors and capacitors, can be used to generate the time delay period independent from the clock frequency. Additionally, exemplary circuitry has been used to describe the present invention in detail but other similar functioning circuitry may be used to replace the exemplary circuitry.

What is claimed is:

1. A tri-state driver controller comprising:

a first latch to receive a data input signal, the first latch clocked by a pulsed clock signal to generate a first latch output;

a second latch to receive the first latch output, the second latch clocked by an inverted pulsed clock signal to generate a latched data output signal to couple into a data input of a tri-state buffer;

a third latch to receive an enable input signal, the third latch clocked by the pulsed clock signal to generate a latched enable signal; and an enable pulse controller having an input coupled to the third latch output to receive the latched enable signal and another input to couple to a global clock signal, the enable pulse controller to gate the latched enable signal to generate a clocked tri-state enable signal to couple into an enable input of a tri-state buffer.

2. The tri-state driver controller of claim 1 wherein, the active level of the clocked tri-state enable signal is generated with a minimal delay from a first edge of the global clock signal, and the inactive level of the clock tri-state enable signal being generated with a time borrowing delay from a second edge of the global clock signal.

3. The tri-state driver controller of claim 1 wherein, the enable pulse controller includes,
   a clock shaper having an input to receive the global clock signal and shape it into an inverted global clock signal, and
   an AND gate having one input coupled to the clock shaper to receive the inverted global clock signal and another input to receive the global clock signal.

4. The tri-state driver controller of claim 3 wherein:

the clock shaper shapes the rising edge of the global clock into a delayed falling edge of the inverted global clock signal to provide a time borrowing delay for the tri-state driver.

5. The tri-state driver controller of claim 3 where in the AND gate comprises:

a NAND gate having a pair of inputs being the inputs of the AND gate, and an inverter having an input coupled to the output of the NAND gate and an output being the output of the AND gate.

6. The tri-state driver controller of claim 3 wherein, the AND gate to logically AND the latched enable signal with the inverted global clock signal.

7. The tri-state driver controller of claim 3 wherein, the enable pulsed controller to gate the latched enable signal with the global clock signal.

8. The tri-state driver controller of claim 1 further comprising:

a pulse generator having an input coupled to the global clock, the pulse generator to generate the pulsed clock on an edge of the global clock having a pulse width responsive to a series of delay elements, and an inverter to receive the pulsed clock to generate the inverted pulsed clock.

9. The tri-state driver controller of claim 8 wherein, the edge of the global clock is the rising edge.

10. The tri-state driver controller of claim 8 wherein, the edge of the global clock is the falling edge.

11. The tri-state driver controller of claim 8 wherein, the global clock substantially has a fifty percent duty cycle.

12. The tri-state driver controller of claim 8 wherein, the delay elements are an odd plurality of inverters coupled in series together.

13. A tri-state bus data communication method comprising:
   latching a data signal using a first pulse generated clock signal and coupling the latched data signal into a data input of a tri-state driver source to drive the latched data signal onto a tri-state bus when its enabled;
   latching an enable signal using the first pulse generated clock signal to generate a latched enable signal;
   anding the latched enable signal with a global clock signal to generate a clocked tri-state enable signal and coupling the clocked tri-state enable signal into an enable input of the tri-state driver source to enable it to drive the latched data signal onto the tri-state bus and to disable the tri-state driver source to allow other tri-state driver sources to drive the tri-state bus; and
   receiving the latched data signal from the tri-state bus and storing it into a receiver latch using a second pulse generated clock signal.

14. The tri-state bus data communication method of claim 13 wherein
   the first pulse generated clock signal has a pulse generated in the first phase of the global clock signal, and
   the second pulse generated clock signal has a pulse generated in the second phase of the global clock signal to borrow time from the next clock cycle in order to receive and store the latched data signal into the receiver latch.

15. The tri-state bus data communication method of claim 13 wherein
   the first pulse clock generated signal is generated by receiving the global clock signal and generating pulses in response to an edge of the global clock signal, the period of the pulses being a function of a first delay element and independent of the frequency of the global clock signal.

16. The tri-state bus data communication method of claim 15 wherein
   the edge of the global clock is the rising edge.

17. The tri-state bus data communication method of claim 15 wherein
   the edge of the global clock is the falling edge.

18. The tri-state bus data communication method of claim 15 wherein,
   the first delay element is an odd plurality of inverters coupled in series together.

19. The tri-state bus data communication method of claim 13 wherein
   the second pulse clock generated signal is generated by receiving the global clock signal and generating pulses in response to an edge of the global clock signal, the period of the pulses being a function of a second delay element and independent of the frequency of the global clock signal.

20. The tri-state bus data communication method of claim 19 wherein
   the edge of the global clock is the rising edge.

21. The tri-state bus data communication method of claim 19 wherein
   the edge of the global clock is the falling edge.

22. The tri-state bus data communication method of claim 19 wherein,
   the second delay element is an odd plurality of inverters coupled in series together.

23. The tri-state bus data communication method of claim 15 wherein,
   the global clock substantially has a fifty percent duty cycle.

24. A microprocessor comprising:
   a shared bi-directional tri-state bus;
   a plurality of tri-state drivers having an output coupled to the shared bi-directional tri-state bus, each of the plurality of tri-state drivers having a tri-state controller coupled thereto, the tri-state controller receiving a first pulsed clock signal to latch an input signal and an enable signal, the latched enable signal being gated by a global clock signal to synchronize the enable timing of the plurality of tri-state drivers to drive the shared bi-directional tri-state bus during a first phase of the global clock signal; and
   a plurality of latches having an input coupled to the shared bi-directional tri-state bus, the plurality of latches being clocked by a second pulsed clock signal to sample data on the shared bi-directional tri-state bus during a second phase of the global clock signal.

25. The microprocessor of claim 24 wherein,
   the shared bi-directional tri-state bus is a data bus and the input signal is a data input signal.

26. The microprocessor of claim 24 wherein,
   the shared bi-directional tri-state bus is an address bus and the input signal is an address input signal.

27. The microprocessor of claim 24 wherein,
   the shared bi-directional tri-state bus is a control bus and the input signal is a control input signal.

28. The microprocessor of claim 24 further comprising,
   a global clock generator to generate the global clock signal from an external clock source.

29. The microprocessor of claim 24 further comprising,
   a first pulsed clock generator to generate the first pulsed clock signal from an edge of the global clock signal.

30. The microprocessor of claim 29 wherein
   the edge of the global clock signal is the rising edge.

31. The microprocessor of claim 29 wherein
   the edge of the global clock signal is the falling edge.

32. The microprocessor of claim 24 further comprising,
   a second pulsed clock generator to generate the second pulsed clock signal from an edge of the global clock signal.

33. The microprocessor of claim 32 wherein,
   the edge of the global clock signal is the rising edge.

34. The microprocessor of claim 32 wherein,
   the edge of the global clock signal is the falling edge.

* * * * *

UNITED STATES PATENT AND TRADEMARK OFFICE
CERTIFICATE OF CORRECTION

PATENT NO.   : 6,346,828 B1
DATED        : February 12, 2002
INVENTOR(S)  : Rosen et al.

It is certified that error appears in the above-identified patent and that said Letters Patent is hereby corrected as shown below:

<u>Column 8,</u>
Line 21, delete "bus 10", insert -- bus 110 --.

Signed and Sealed this

Fifteenth Day of October, 2002

*Attest:*

*Attesting Officer*

JAMES E. ROGAN
*Director of the United States Patent and Trademark Office*